(No Model.)

C. BERGMANN.
MEASURING APPARATUS FOR HATS.

No. 372,295. Patented Nov. 1, 1887.

Witnesses:
Paul Fischer
Gustav Bütner

Inventor
Carl Bergmann
by H. Muratak
his atty

United States Patent Office.

CARL BERGMANN, OF GUBEN, PRUSSIA, GERMANY.

MEASURING APPARATUS FOR HATS.

SPECIFICATION forming part of Letters Patent No. 372,295, dated November 1, 1887.

Application filed January 26, 1887. Serial No. 225,499. (No model.)

*To all whom it may concern:*

Be it known that I, CARL BERGMANN, manufacturer, of Guben, in the Kingdom of Prussia and German Empire, have invented new and useful Measuring Apparatus for Hats, of which the following is a specification, reference being had therein to the accompanying drawings, no patents having been obtained by me anywhere for this invention until now.

My invention relates to measuring apparatus for hats.

The measuring apparatus forming the subject of my invention enables the internal diameter or size of hats to be ascertained with great facility and accuracy. For this purpose the apparatus is provided with a band or spring of steel or other flexible material, which is coiled in the interior of the hat that is to be measured, and being caused, by suitable mechanism hereinafter described, to be applied against the internal periphery of the hat, imparts a corresponding motion to an index or pointer which indicates the dimensions of the hat upon a graduated scale or dial.

In order that my said invention may be fully understood, I shall now proceed more particularly to describe the same, and for that purpose shall refer to the several figures on the annexed sheet of drawings, the same letters of reference indicating corresponding parts in all the figures.

Figure 1:
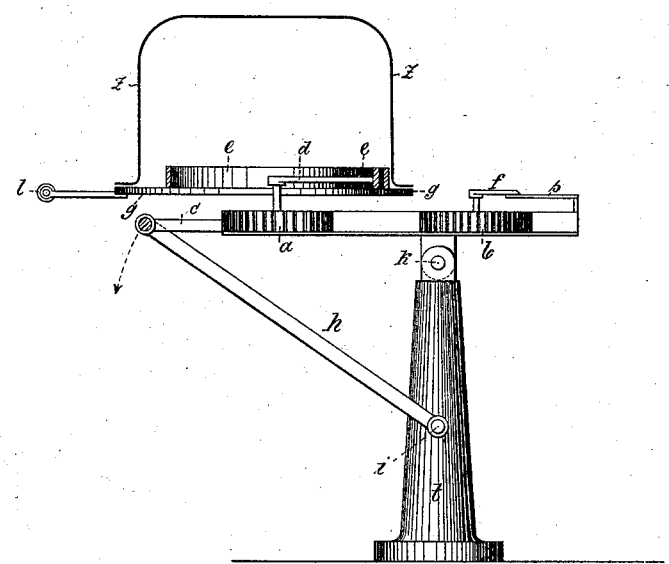
Figure 2:
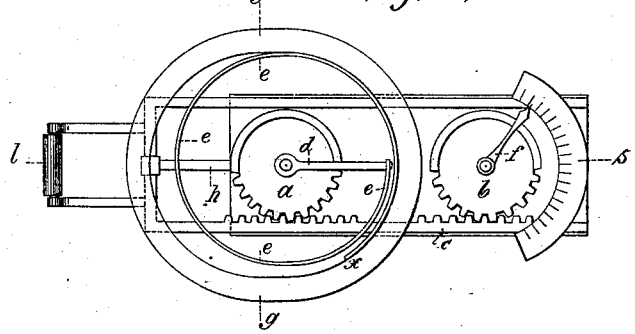

Figure 1 of the accompanying drawings represents an elevation, partly in section, of an apparatus constructed according to my invention; and Fig. 2 represents the said apparatus in plan.

This apparatus is provided with two toothed wheels or pinions, $a$ and $b$, gearing with rack-teeth on a sliding frame or bar, $c$. On the axis of the wheel $a$ there is fixed a horizontal arm or lever, $d$, to the extremity of which is attached one end of a flexible band, $e$, of steel or brass, for example. This band is secured at its other extremity, at $x$, to a frame or platform, $g$, forming a support for the hat that is to be measured. The axis of the wheel $b$ carries an index or pointer, $f$, traveling over a graduated segment, $s$. To the frame or bar $c$ is jointed a bar, $h$, jointed to the stand or support of the apparatus at $i$, and the upper part of the apparatus is capable of being turned or rocked bodily upon an axis, $k$, on the said stand or support.

I will now describe the action of the apparatus. After the hat that is to be measured is placed upon the platform $g$, as indicated at $z$, the upper part of the apparatus is tilted on the axis $k$ by depressing a handle, $l$, and the frame $c$, being attached to the bar $h$, which is jointed to the fixed point $i$, is thereby caused to slide outward or toward the left hand in the drawings, so that the rack-teeth on the said frame impart rotary motion to the two wheels $a$ and $b$. The rotary motion thus imparted to the wheel $a$ and arm $d$ uncoils or expands the band $e$ and applies it forcibly against the internal surface or periphery of the hat. At the same time the wheel $b$ is rotated to a corresponding extent, and the index $f$ indicates the internal dimension of the hat upon the division on the scale $s$.

What I claim, and desire to secure by Letters Patent of the United States, is—

In an apparatus for measuring hats, the combination of the flexible band $e$ with the horizontal lever $d$, which sets in motion the toothed wheel or pinion $a$, in combination, further, with a toothed bar and the toothed wheel $b$, which carries the pointer $f$, traveling over a graduated segment, $s$.

In witness whereof I have hereunto set my hand in presence of two witnesses.

CARL BERGMANN.

Witnesses:
 WILHELM PATAKY,
 B. ROI.